United States Patent
Evans et al.

(10) Patent No.: US 9,853,762 B2
(45) Date of Patent: Dec. 26, 2017

(54) AUTOMATED PROVISIONING AND CONTROL OF SHARED OPTICAL SPECTRUM IN SUBMARINE OPTICAL NETWORKS

(71) Applicants: Darwin Bruce Evans, Ottawa (CA); Robert Hadaway, Dunrobin (CA); Loren Berg, Richmond (CA)

(72) Inventors: Darwin Bruce Evans, Ottawa (CA); Robert Hadaway, Dunrobin (CA); Loren Berg, Richmond (CA)

(73) Assignee: Ciena Corporation, Hanover, MD (US)

( * ) Notice: Subject to any disclaimer, the term of this patent is extended or adjusted under 35 U.S.C. 154(b) by 5 days.

(21) Appl. No.: 14/560,758

(22) Filed: Dec. 4, 2014

(65) Prior Publication Data

US 2016/0164597 A1 Jun. 9, 2016

(51) Int. Cl.
 *H04J 14/02* (2006.01)
 *H04Q 11/02* (2006.01)
 *H04B 10/50* (2013.01)
 *H04B 10/564* (2013.01)
 *H04B 10/572* (2013.01)

(52) U.S. Cl.
 CPC ........ *H04J 14/0221* (2013.01); *H04B 10/506* (2013.01); *H04B 10/564* (2013.01); *H04B 10/572* (2013.01); *H04J 14/0278* (2013.01); *H04Q 11/02* (2013.01)

(58) Field of Classification Search
 CPC .. H04B 10/506; H04B 10/564; H04B 10/572; H04J 14/02–14/0221; H04J 14/026; H04J 14/0278
 See application file for complete search history.

(56) References Cited

U.S. PATENT DOCUMENTS

| 5,898,693 | A | 4/1999 | Vecchi et al. | |
|---|---|---|---|---|
| 6,233,076 | B1 * | 5/2001 | Iwata | H04J 14/0221 398/14 |
| 6,426,817 | B1 * | 7/2002 | Tomita | H04B 10/296 398/158 |
| 6,704,511 | B1 * | 3/2004 | Kerfoot, III | H04B 10/296 398/149 |

(Continued)

FOREIGN PATENT DOCUMENTS

WO 2013009571 A1 1/2013

OTHER PUBLICATIONS

May 3, 2016 European Search Report issued in European Patent Application No. 15193331.4.

(Continued)

*Primary Examiner* — Li Liu
(74) *Attorney, Agent, or Firm* — Clements Bernard Walker PLLC; Christopher L. Bernard; Lawrence A. Baratta, Jr.

(57) ABSTRACT

Systems and methods of sharing optical spectrum between a plurality of users of a submarine optical system includes receiving one or more optical signals from the plurality of users of the submarine optical system, wherein each of the plurality of users are assigned a slice of optical spectrum on the submarine optical system; monitoring each of the one or more optical signals to determine compliance with one or more constraints; and adding the one or more optical signals to the submarine optical system if compliant with the one or more constraints.

20 Claims, 5 Drawing Sheets

(56) References Cited

U.S. PATENT DOCUMENTS

| | | | |
|---|---|---|---|
| 6,708,002 B1* | 3/2004 | Novak | H04B 10/25253 385/24 |
| 6,810,214 B2* | 10/2004 | Chbat | H04B 10/2941 359/337 |
| 7,123,834 B2* | 10/2006 | Hullin | H04J 14/0221 398/162 |
| 7,177,540 B2* | 2/2007 | Inoue | H04J 14/0221 398/16 |
| 7,233,432 B2* | 6/2007 | Islam | H04J 14/0221 359/334 |
| 7,663,801 B2* | 2/2010 | Abbott | H04B 10/2933 359/337 |
| 8,009,985 B1* | 8/2011 | Roberts | H04J 3/14 398/47 |
| 8,335,432 B1* | 12/2012 | Darcie | H04J 14/0257 398/58 |
| 8,364,036 B2 | 1/2013 | Boertjes et al. | |
| 8,731,402 B2 | 5/2014 | Jander et al. | |
| 8,873,963 B2* | 10/2014 | Handelman | H04J 14/02 398/135 |
| 9,161,107 B2* | 10/2015 | Ji | H04Q 11/0066 |
| 2003/0005095 A1* | 1/2003 | Fee | H04L 41/0663 709/221 |
| 2003/0031433 A1* | 2/2003 | Feinberg | H04B 10/077 385/100 |
| 2003/0048508 A1* | 3/2003 | Yu | H04B 10/506 398/91 |
| 2003/0058497 A1 | 3/2003 | Park et al. | |
| 2003/0113117 A1* | 6/2003 | Taneda | H04B 10/25133 398/79 |
| 2004/0156644 A1* | 8/2004 | Yasue | H04B 10/5057 398/198 |
| 2005/0013610 A1 | 1/2005 | Evangelides et al. | |
| 2005/0024715 A1* | 2/2005 | Inoue | H04J 14/0221 359/337 |
| 2005/0213980 A1* | 9/2005 | Ota | H04B 10/2918 398/84 |
| 2005/0232634 A1* | 10/2005 | Evangelides, Jr. | H02G 9/00 398/105 |
| 2005/0271075 A1* | 12/2005 | Cioffi | H04L 12/2889 370/445 |
| 2006/0051093 A1* | 3/2006 | Manna | H04B 10/296 398/79 |
| 2006/0228113 A1* | 10/2006 | Cutillo | H04J 3/1694 398/71 |
| 2006/0263089 A1* | 11/2006 | Furst | H04B 10/296 398/79 |
| 2008/0219290 A1* | 9/2008 | Cioffi | H04L 5/1438 370/465 |
| 2008/0304829 A1* | 12/2008 | Sato | H04J 14/0221 398/79 |
| 2008/0310858 A1* | 12/2008 | Lu | H04B 10/296 398/158 |
| 2012/0087658 A1* | 4/2012 | Jander | H04J 14/02 398/48 |
| 2012/0251117 A1* | 10/2012 | Patel | H04J 14/0224 398/79 |
| 2013/0045006 A1* | 2/2013 | Dahan | H04J 14/0257 398/34 |
| 2013/0058647 A1* | 3/2013 | Boertjes | H04B 10/0775 398/38 |
| 2013/0084075 A1* | 4/2013 | Hussain | H04L 5/0094 398/141 |
| 2013/0195452 A1* | 8/2013 | Hui | H04J 14/022 398/50 |
| 2013/0259055 A1* | 10/2013 | Ji | H04Q 11/00 370/400 |
| 2013/0259475 A1* | 10/2013 | Ji | H04Q 11/00 398/48 |
| 2013/0315591 A1 | 11/2013 | Inoue | |
| 2014/0044431 A1* | 2/2014 | Hussain | H04J 14/0227 398/79 |
| 2014/0241720 A1* | 8/2014 | Ji | H04Q 11/0066 398/50 |
| 2014/0334814 A1* | 11/2014 | Ji | H04J 14/0221 398/26 |
| 2015/0229404 A1* | 8/2015 | Boertjes | H04L 69/324 398/183 |
| 2015/0229528 A1* | 8/2015 | Swinkels | H04L 41/0896 398/45 |
| 2015/0333824 A1* | 11/2015 | Swinkels | H04J 14/0241 398/25 |
| 2015/0365189 A1* | 12/2015 | Prakash | H04B 10/0795 398/34 |

OTHER PUBLICATIONS

"40G/100G Submarine Applications," Ciena Corporation, pp. 1-3, 2011.
"Consolidated Metro Cable Landing Stations," Ciena Corporation, pp. 1-3, 2012.
"Survivable Submarine Optical Networks," Ciena Corporation, pp. 1-6, 2011.
Adams, Matthew, "ROADM andWavelength Selective Switches," JDSU, www.jdsu.com/test, pp. 1-8, 2008.

* cited by examiner

AUTOMATED PROVISIONING AND CONTROL OF SHARED OPTICAL SPECTRUM IN SUBMARINE OPTICAL NETWORKS

FIELD OF THE DISCLOSURE

The present disclosure relates generally to fiber optic systems and methods. More particularly, the present disclosure relates to systems and methods for automated provisioning and control of shared optical spectrum in submarine optical networks.

BACKGROUND OF THE DISCLOSURE

Submarine optical networks are deployed by cable owners or a consortia of operators to provide connectivity across stretches of ocean. The conventional operating model for submarine optical networks is to provide fixes bandwidth to end customers. Fixed bandwidth is a fixed amount, e.g. 10 Gb/s, etc. From a commercial standpoint, it is more advantageous for owners or the consortia to provide optical spectrum to users (as defined herein, users are typically service providers or the like who get bandwidth from the consortia). To provide spectrum, each user is given optical access, i.e. passive coupling, to a submarine optical system at a defined portion of the optical spectrum, and the user operates optical head-end equipment through the passive coupling in the defined portion. Since the optical spectrum is shared, changes made by one user affect other users on the same submarine optical system. Such an arrangement is possible between two users, where manual coordination is feasible and commercial agreements can be put in place for operations on the submarine optical system. However, if there are multiple users, this becomes increasingly challenging to manually coordinate and police for compliance. For example, if one user disconnects their traffic (removed optical power), the remaining users see an increase in launch power that could lead to enough propagation penalties causing the remaining users to see failures or errors. Also, there is no way, with the passive coupling, to ensure the users are honoring their agreement with respect to launch power, power spectral density, spectrum usage, and the like. Such challenges have to be automatically addressed for submarine optical networks to move towards optical spectrum as the end product instead of fixed bandwidth.

BRIEF SUMMARY OF THE DISCLOSURE

In an exemplary embodiment, a method of sharing optical spectrum between a plurality of users of a submarine optical system includes receiving one or more optical signals from the plurality of users of the submarine optical system, wherein each of the plurality of users are assigned a slice of optical spectrum on the submarine optical system; monitoring each of the one or more optical signals to determine compliance with one or more constraints; and adding the one or more optical signals to the submarine optical system if compliant with the one or more constraints. The one or more constraints can relate to spectrum width and total output power of each of the optical signals. The method can further include adding a power management signal in unallocated spectrum on the submarine optical system. Each of the slices of the optical spectrum can be defined with a total output power and a power spectral density mask that is monitored for compliance thereto.

The method can further include, if the one or more optical signals for a specific slice are below a defined threshold, for a total output power and/or a power spectral density mask, replacing the one or more optical signals with a power management signal to minimize impact to other users. The method can further include, if the one or more optical signals for a specific slice are above a defined threshold, inducing a tilt on the one or more optical signals to maintain total output power for the specific slice. The method can further include preventing access by each of the plurality of users to other portions of the optical spectrum besides their assigned slice. The one or more optical signals can be added to a cable interfacing a wet plant of the submarine optical system, the wet plant including repeaters that operate in a total output power mode, and wherein associated Submarine Line Terminating Equipment forming the one or more optical signals can be demarcated and operated separately from the wet plant. The receiving step, the monitoring step, and the adding step can be performed by a spectrum partitioning device.

In another exemplary embodiment, a spectrum partitioning device for sharing optical spectrum between a plurality of users of a submarine optical system includes N input ports each configured to receive one or more optical signals from the plurality of users of the submarine optical system, wherein each of the plurality of users are assigned a slice of optical spectrum on the submarine optical system; a common port coupled to a wet plant of the submarine optical system; and wavelength switching components, each wavelength switching component configured to selectively switch one of the N input ports to the common port, wherein the spectrum partitioning device is configured to monitor each of the one or more optical signals to determine compliance with a one or more constraints and to add the one or more optical signals to the submarine optical system if compliant with the one or more constraints. The one or more constraints can relate to spectrum width and total output power of each of the optical signals.

The wavelength switching components can be configured to add a power management signal in unallocated spectrum on the submarine optical system. Each of the slices of the optical spectrum can be defined with a total output power and a power spectral density mask that is monitored for compliance thereto. If the one or more optical signals for a specific slice are below a defined threshold for a total output power and/or a power spectral density mask, the wavelength switching components can be configured to replace the one or more optical signals for the specific slice with a power management signal to minimize impact to other users. If the one or more optical signals for a specific slice are above a defined threshold, the wavelength switching components can be configured to induce a tilt on the one or more optical signals to maintain total output power for the specific slice. The wavelength switching components can be configured to prevent access by each of the plurality of users to other portions of the optical spectrum besides the assigned slice. Associated Submarine Line Terminating Equipment forming the one or more optical signals can be demarcated and operated separately from the wet plant with repeaters in the wet plant operating in a total output power mode. The wavelength switching components can be a Wavelength Selective Switch.

In a further exemplary embodiment, a submarine optical system, with users each responsible for their own associated head end equipment includes a wet plant; and a spectrum partitioning device between the wet plant and Submarine Line Terminating Equipment (SLTE) associated with the users; wherein access to the submarine optical system by the users is based on assigned optical spectrum with the spectrum partitioning device configured to automatically ensure compliance to a plurality of constraints for the assigned optical spectrum.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various exemplary embodiments, systems and methods are described for automated provisioning and control of shared optical spectrum in submarine optical networks. The systems and methods enable submarine optical networks to provide spectrum to end customers while automating the process of ensuring action of each spectrum user does not impact other users that have purchased optical spectrum on the same submarine optical network. The systems and methods include a spectrum partitioning device that enables a submarine optical network owner to sell optical spectrum as Optical Virtual Private Networks (VPNs) to various end users while providing automated functions ensuring no user performs actions that will adversely affect other users.

Figure 1:
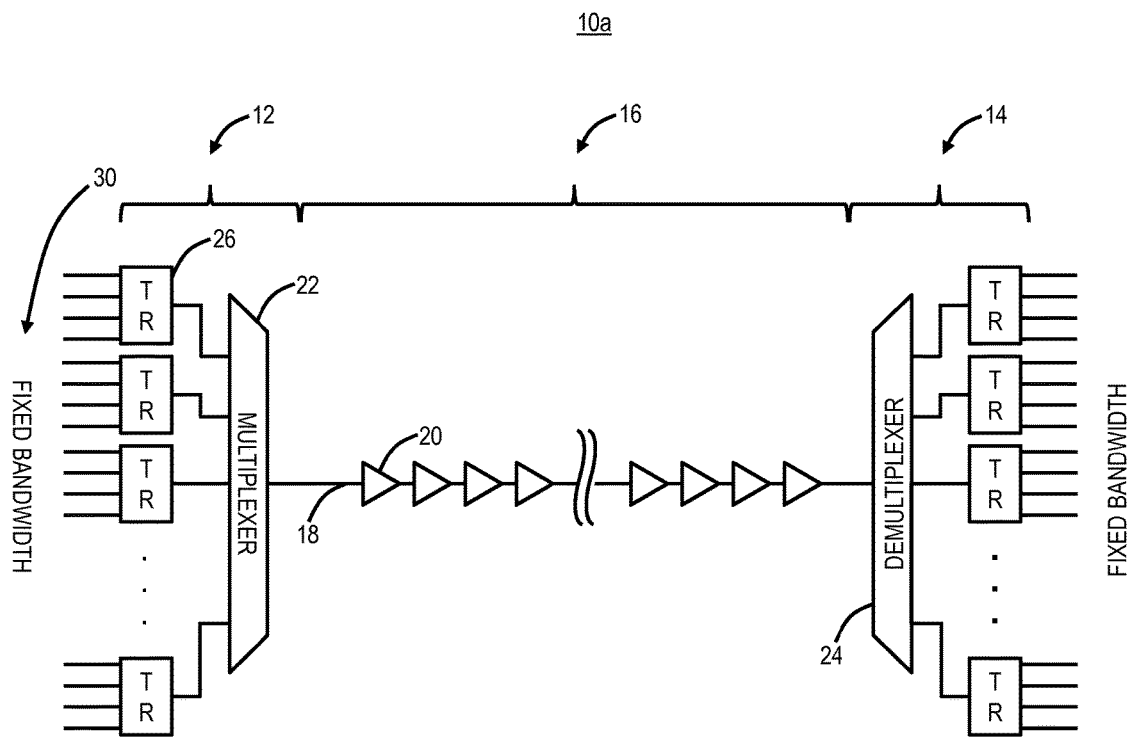
FIG. 1 is a network diagram of a conventional submarine optical network.

Referring to FIG. 1, in a conventional embodiment, a network diagram illustrates a submarine optical network 10a. For illustration purposes, the submarine optical network 10a is shown with a single direction from a first terminal station 12 to a second terminal station 14. Of course, a practical embodiment will include the opposite direction. The submarine optical network 10a generally includes, from a topology perspective, the terminal stations 12, 14 and a wet plant 16 interconnecting the terminal stations 12, 14. The wet plant 16 generally includes a cable 18, repeaters 20, and, optionally branching units (not shown in FIG. 1). The cable 18 includes fiber optic strands as well as protection from being submerged in the ocean and power connectivity from the terminal stations 12, 14 for each of the repeaters. The repeaters 20 are optical amplifiers spaced at various intervals along the cable 18. Note, the repeaters 20 can be fully encased within the cable for protection. The branching units (not shown) provide an ability for the terminal stations 12, 14 to connect to other terminal stations besides one another, i.e. an optical add/drop multiplexer that enables branching. Also, the submarine optical network 10a is a repeatered, and there are other types of submarine optical networks such as unrepeatered or festoon which do not require the repeaters 20. Again, while illustrating a single direction with a single set of repeaters, the submarine optical network 10a can include multiple directions (i.e. fiber strands in the same cable 18) and multiple repeaters 20 in the same cable.

At the terminal stations 12, 14, the submarine optical network 10a includes Submarine Line Terminating Equipment (SLTE) such as optical multiplexers 22, demultiplexers 24, and transceivers/transponders 26. The terminal stations 12, 14 can also include power units (not shown) and bandwidth grooming network elements such as SONET/SDH or OTN add/drop multiplexers or cross-connects. In this conventional embodiment, an output, from the SLTE equipment is fixed bandwidth 30. For example, the Southern Cross Cable operating in the Pacific Ocean provides the fixed bandwidth 30 as services such as STM-1 (155 Mb/s) to 100 Gbit/s OTU-4, including 1G, 10G and 40G Ethernet Private Line services. The TAT-14 cable in the Atlantic Ocean provides the fixed bandwidth 30 as services from STM-1 (155,52 Mb/s) up to STM-256 (40 Gb/s).

Figure 2:
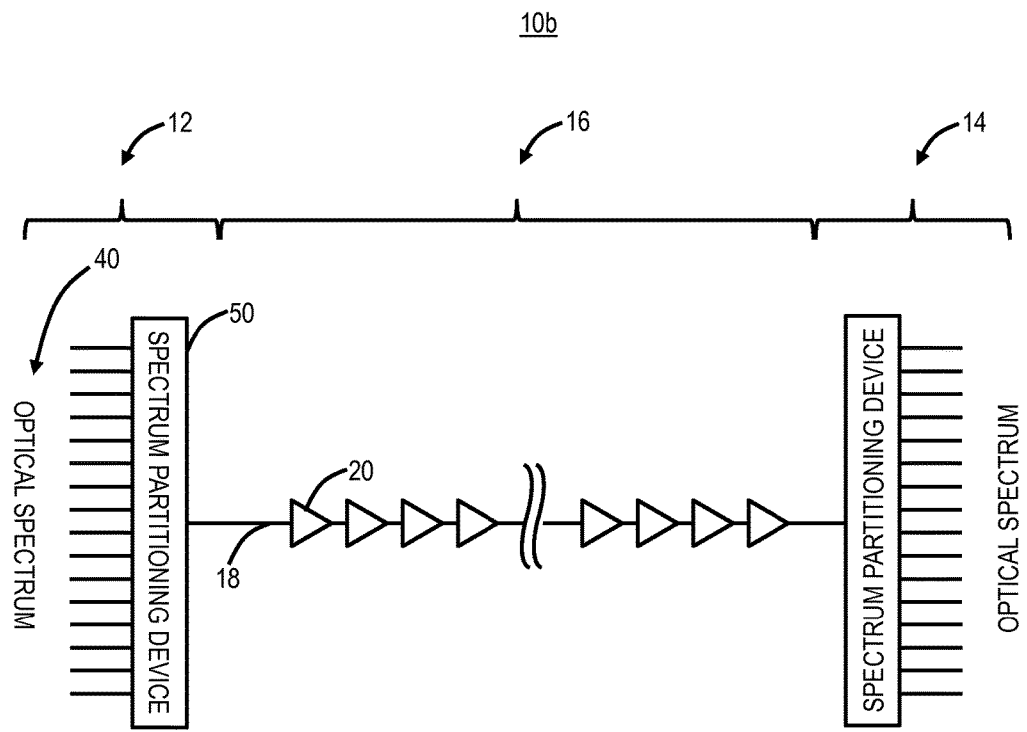
FIG. 2 is a network diagram of a submarine optical network using the systems and methods to provide optical spectrum to end customers.

Referring to FIG. 2, in an exemplary embodiment, a network diagram illustrates a submarine optical network 10b using the systems and methods to provide optical spectrum 40 to end customers. Note, the submarine optical network 10b can have the same wet plant 16 as the submarine optical network 10a. Also, the submarine optical network 10b can include unrepeatered systems or systems with branching units. However, in contrast with the submarine optical network 10a, the submarine optical network 10b provides the optical spectrum 40 instead of the fixed bandwidth 30. Again, as described herein, owners/consortia associated with the submarine optical networks 10a, 10b are moving from a model of selling capacity, i.e. the fixed bandwidth 30, to end customers to selling the optical spectrum 40 to end customers. In the submarine optical network 10b, the end customers are able to install their own SLTE equipment including different SLTE equipment from the wet plant 16 equipment. There are advantages to decoupling the SLTE equipment from the wet plant 16 including multiple sourcing, use of more advanced transceivers and modems, and the like. From the owners/consortia perspective, the optical spectrum 40 can have more commercial value than the fixed bandwidth 30.

The submarine optical network 10b includes a spectrum partitioning device 50 coupled to the wet plant 16 at the terminal stations 12, 14. The spectrum partitioning device 50 provides a mechanism to provide spectrum to end customers while automating the process of ensuring action of each spectrum user do not impact other users that have purchased optical spectrum on the same submarine cable. To sell the optical spectrum 40 in the submarine optical network 10b, the spectrum partitioning device 50 is required to partition the optical spectrum 40 between the various end users and ensure changes made by one user does not impact other users. As described herein, the optical spectrum 40 is on each fiber strand in the cable 18.

The submarine optical network 10b, similar to the submarine optical network 10a, uses a chain of optical amplifiers, known as the repeaters 20, which operate in Total Output Power (TOP) mode. In this mode of operations, a change in spectral characteristics in one part of the optical spectrum 40 at the input to the cable 18 has an impact to the optical response on other parts of the optical spectrum 40 at the output of the cable 18. Again, one approach to spectrum sharing is the passive coupling of multiple end users with commercial agreements in place to minimize the effect of changes by one user affecting other users. The spectrum partitioning device 50 allows the optical spectrum 40 to be divided into a number of optical VPNs that are policed and controlled to ensure the various end users do not impact each other via an automated process. Note, the terminal stations 12, 14 can have the spectrum partitioning device 50 for each fiber strand in the cable 18.

Figure 3:
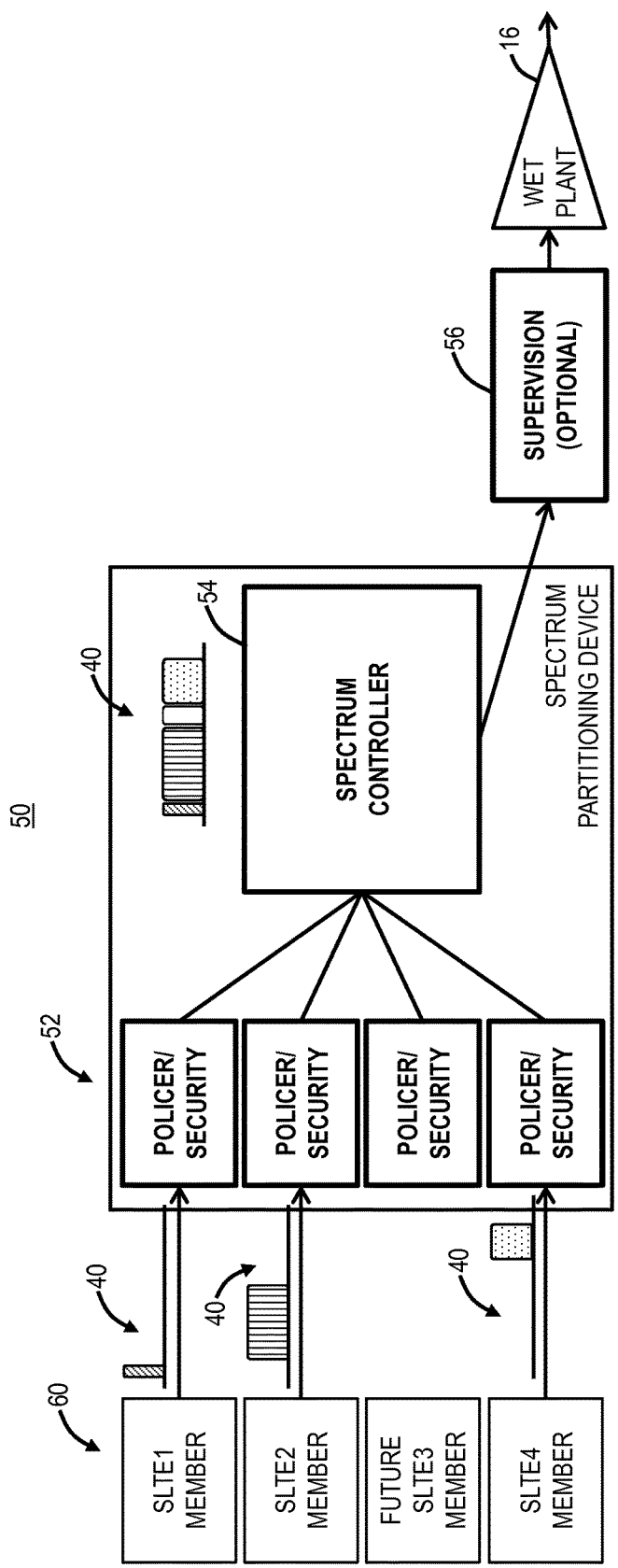
FIG. 3 is a block diagram of an exemplary implementation of the spectrum partitioning device.

Referring to FIG. 3, in an exemplary embodiment, a block diagram illustrates an exemplary implementation of the spectrum partitioning device 50. The spectrum partitioning device 50 provides open access to a portion of the optical spectrum 40 for end customers, a flexible grid accommodating different channel occupancy, establishes and polices member spectrum width/launch power, preserves system availability by replacing power management in a fault condition, and anticipates multiple SLTE changes within design life. The spectrum partitioning device 50 includes various functions such as, policer and security 52, a spectrum controller 54, and supervision 56. The policer and security 52 is responsible for ensuring SLTE inputs align with requirements of occupancy and TOP and only the receive spectrum matching the transmit spectrum is visible to the SLTE. The policer and security 52 includes monitoring of inputs/outputs from the end customers (users) to determine compliance with a plurality of constraints. The monitoring can be performed with an optical tap which is coupled to a photodetector. The spectrum controller 54 is responsible for enforcing allocation of the optical spectrum 40 and for power management in unallocated spectrum segments. This is performed through automatic control of wavelength selective components in the spectrum partitioning device 50. The supervision 56 is optional and provides supervisory communications with the wet plant 16. For example, the supervision 56 can provide Operations, Administration, and Maintenance (OAM) functionality.

The spectrum partitioning device 50 allows the cable owner/consortia to define slices of spectrum available to each user. Each slice of spectrum is assigned an available Total Output Power and a power spectral density mask. The spectrum partitioning device 50 can enforce requirements on the signal propagated such as TOP and power spectral density. The policer and security 52 exist for each defined end user 60. The policer and security 52 makes the defined optical spectrum 40 available to the end user 60 in the transmit and receive directions to ensure each user 60 only has access to view the spectrum allocated to them (i.e., the security functionality). Once the optical spectrum 40 is allocated, the policer and security 52 monitors the incoming optical spectrum 40 to ensure the optical signal is within the defined power spectral density mask (i.e., the policer functionality). The policer and security 52 can be realized with an optical tap and photodetector which monitors the optical signal. If the signal does not conform to the input requirements, the policer and security 52 messages the spectrum controller 54.

The spectrum controller 54 maintains the provisioned TOP for each spectral slice in normal operation. A spectral slice is an assigned portion of the optical spectrum 40 for a specific end customer. In the case of the policer and security 52 messaging a fault on the input signal, the spectrum controller 54 removes the input spectrum provided by the user and replaces it with a power management signal to maintain the defined power spectral density mask. The power management signal can be referred to as a keep alive signal. When the policer and security 52 indicates the input spectrum is in compliance, the spectrum controller 54 switches the user spectrum back to the output, i.e. to the wet plant 16. Any spectrum not defined or assigned with an end user is filled by the spectrum controller 54 with power management signals.

Thus, from a functional perspective, the policer and security 52 is configured to enforce spectrum specifications and ensure only member spectrum visibility. The spectrum controller 54 is configured to allocate line spectrum, apply power management in allocating spectrum, and replace inputs with a power management signal in fault conditions. From an end customer perspective, the SLTE specified spectrum includes three constraints (each of which is enforced by the spectrum partitioning device 50) of spectrum width, TOP including traffic and individual power management, and maximum tilt/pre-emphasis. Note, the actual settings are under the control of the end user 60, and the function of the spectrum partitioning device 50 is to ensure compliance. In non-compliant scenarios, the spectrum partitioning device 50 is configured to replace the end user 60's input with the power management signals, and notify the end user 60 as such, not to modify SLTE equipment associated with the end user 60.

In an exemplary embodiment, the spectrum controller 54 allows access, for the optical spectrum 40, to be divided into a number of segments such as between 195.850-191.915 THz addressable via the spectrum controller 54 in 12.5 GHz increments. This is equivalent to 120 channels on a 37.5 GHz grid. Note, the spectrum controller 54 can include a dead band on each edge of a segment induced by the hardware technology used in the controller that is unavailable for traffic channels. Each of the end users 60 is assigned spectrum width for their associated SLTE equipment. The spectrum width, spectrum location in the overall optical spectrum 40, and the repeater 20 specifications result in an associated TOP being assigned to the spectrum segment. Note, the spectrum partitioning device 50 only considers the three constraints above, so there are no restrictions on channel spacing within the spectrum segment. Also, an SLTE can have access to multiple spectrum segments. The SLTE is responsible for power management within the assigned spectrum, and the power management can include a guard band from the edge of the spectrum segment determined by the type of power management used.

Figure 4:
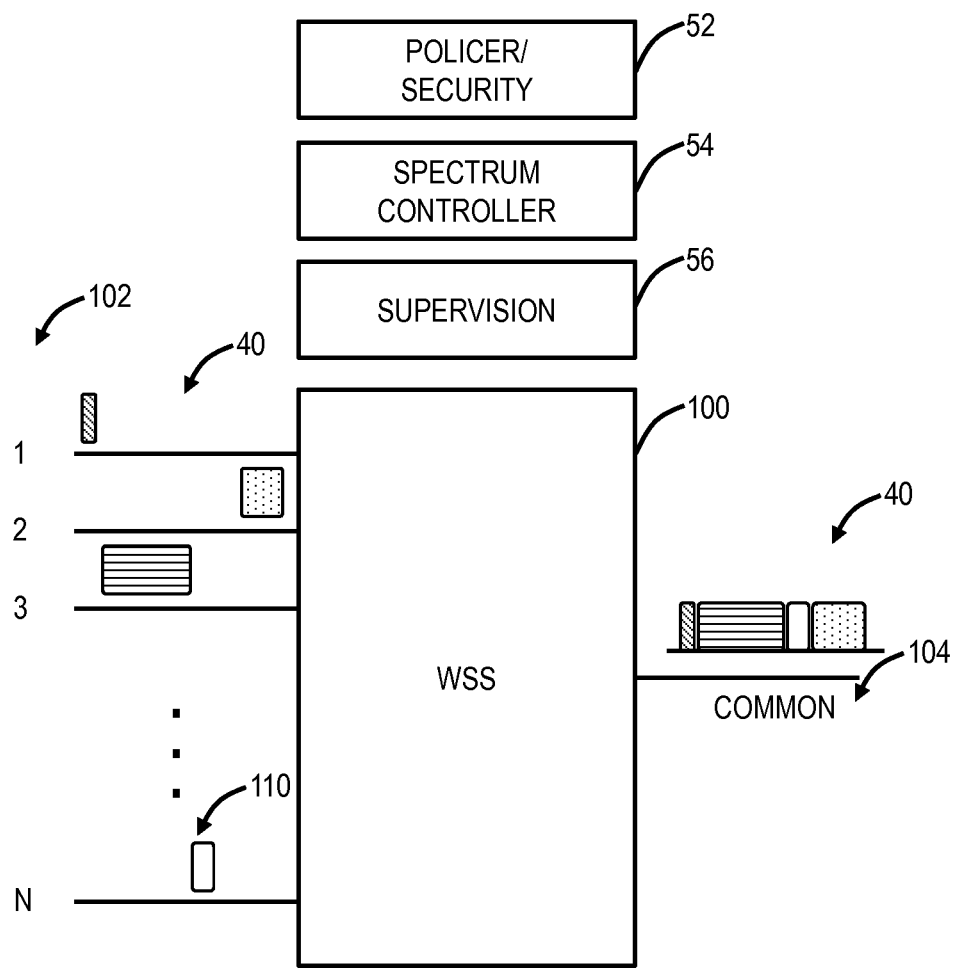
FIG. 4 is a block diagram of an exemplary implementation of the spectrum partitioning device with a Wavelength Selective Switch (WSS)

Referring to FIG. 4, in an exemplary embodiment, a block diagram illustrates an exemplary implementation of the spectrum partitioning device 50 with a Wavelength Selective Switch (WSS) 100. The WSS 100 is configured to couple one or more wavelengths from N input ports 102 to a common port 104. To indicate device fan out, these devices are often classified as "1×N" devices, with a "1×9" WSS meaning a 10 port device, with 1 common port and 9 individual ports. Note, functionally, the flow can be in either direction—from the input ports 102 to the common port 104 when acting as a multiplexer, or from the common port 104 to the input ports 102 when acting as a demultiplexer (here, the input ports 102 may more accurately be characterized as output ports). The WSS 100 can support N spectrum segments, e.g. N=9, 20, etc. Each of the N input ports 102 are assigned to one of the end customers 60 with a specific spectrum width, TOP, and maximum tilt/pre-emphasis. Note, each of the end customers (users) 60 is prevented from accessing anything by its assigned spectrum based on the spectrum controller 54 functionality. That is, the spectrum controller 54 demarcates the N input ports 102 from one another. For example, if an end customer 60 has signals outside of assigned spectrum, the spectrum controller 54 will drop these signals and not add them to the common port 104. The spectrum controller 54 functionality ensures that the end customers 60 abide by the constraints. Finally, the supervision 56 can include provided select OAM between the end customers 60 and the wet plant 16. For the policer and security 52, the WSS 100 includes an optical monitoring system on each of the N input ports 102 as well as on the common port 104. The optical monitoring system includes an optical tap which takes a small portion (e.g. 2%, etc.) of the signal from a monitored port and provides the small portion to a photodetector where the monitored port can be monitored, for power, spectrum, etc.

In operation, each of the N input ports 102 can be assigned a portion of the spectrum, such that all of the optical spectrum 40 is covered. If there is not an appropriately powered signal on a portion of the optical spectrum 40, the WSS 100 can be configured to add a power management signal 110 for keep alive purposes on the wet plant 16, i.e. so the TOP is maintained. The power management signal 110 can be switched from one of the N input ports 102 to the common port 104 as appropriate and in the appropriate portion of the optical spectrum 40.

The spectrum partitioning device 50 contemplates the realization with any type of technology for the WSS 100 such as Microelectromechanical Mirrors (MEMS), Binary Liquid Crystal (LC), Liquid Crystal on Silicon (LCoS), or the like. As described above, the optical spectrum of 195.850-191.915 THz addressable via the spectrum controller 54 in 12.5 GHz increments is based on the WSS 100 technology along with the dead band based on the WSS 100 technology on each edge of a segment that is unavailable for traffic channels. These values may change based on the specific WSS 100 used to implement the spectrum partitioning device 50. In fact, the spectrum partitioning device 50 contemplates realization in other types of equipment besides the WSS 100, such as any optical device configured to selectively route wavelengths, monitor power, and the like.

Figure 5:
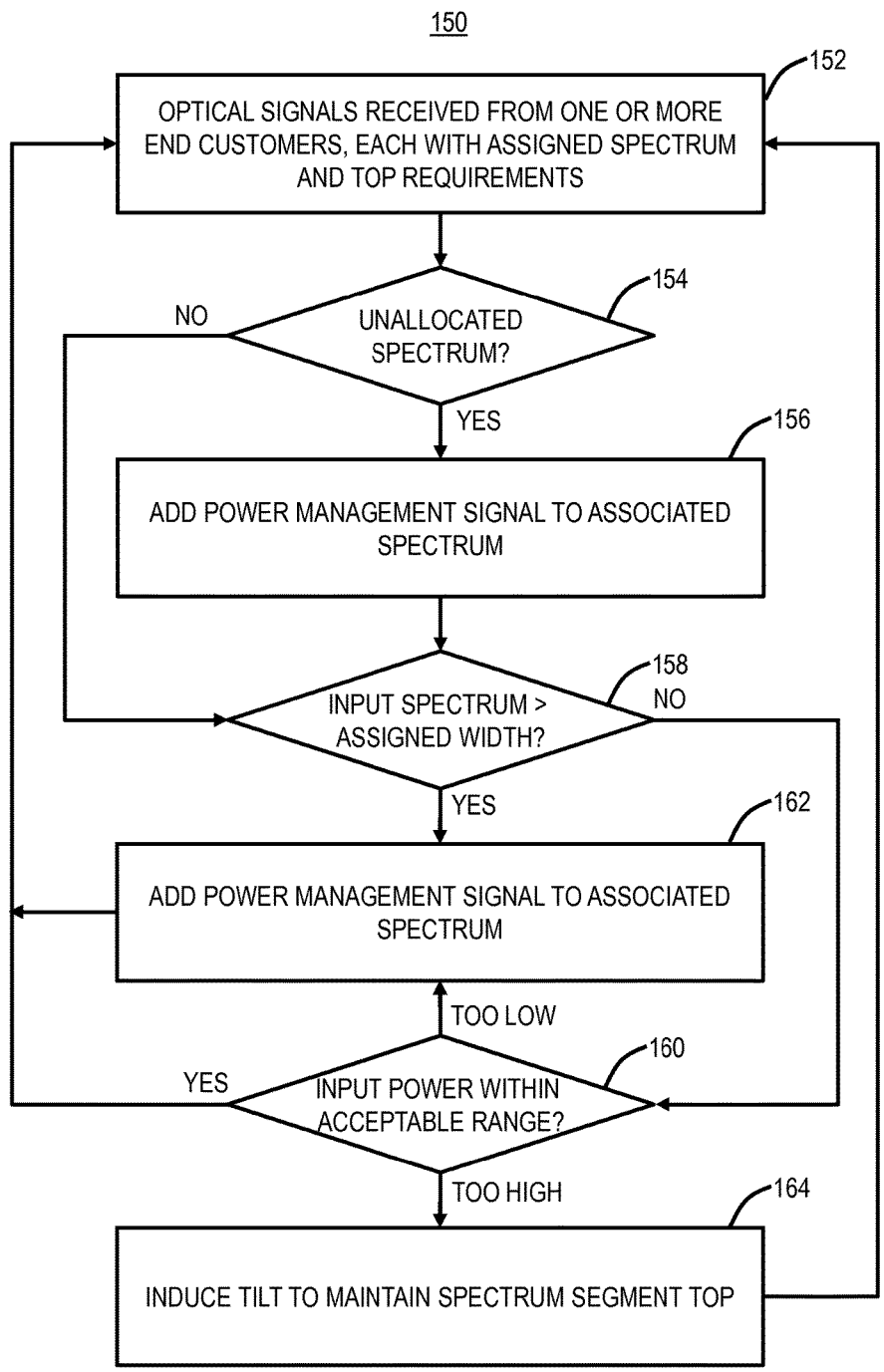
FIG. 5 is a flow chart of a spectrum partitioning method for automated provisioning and control of shared optical spectrum in submarine optical networks.

Referring to FIG. 5, in an exemplary embodiment, a flow chart illustrates a spectrum partitioning method 150 for automated provisioning and control of shared optical spectrum in submarine optical networks. The spectrum partitioning method 150 contemplates operation in/by the spectrum partitioning device 50 to perform the policer and security 52 functions and the spectrum controller 54 functions. Optical signals are received from one or more end customers, each with assigned spectrum and TOP requirements (step 152). As described herein, the traffic is added via the policer and security 52 functions—the policer ensuring compliance (with spectral width and TOP requirements) and the security ensuring access to only assigned spectrum. The spectrum partitioning method 150 includes, for any unallocated spectrum (step 154), adding a power management signal to the associated spectrum (step 156). The unallocated spectrum can include portions of the optical spectrum with no assigned end customers or with assigned end customers who are not currently transmitting.

The spectrum partitioning method 150 includes checking each spectrum segment with signals received thereon to ensure the signals are within the assigned width and the TOP is appropriate (steps 158, 160). That is, the spectrum partitioning method 150 ensures the SLTE signal aligns with the width and power requirements. In this manner, the spectrum partitioning method 150 acts much like a TOP controlled repeater for the spectrum segment. The policer can trigger the spectrum controller 54 to maintain the assigned TOP within a defined power mask. If the input spectrum is outside an assigned width (step 158), the spectrum partitioning method 150 includes the spectrum controller 54 replacing the input spectrum with the power management signal to ensure operation of traffic in the other assigned spectrum segments with minimal impact (step 162). If the input power is not within an acceptable range, such as being too high (step 160), the spectrum controller 54 can induce a tilt as it maintains the spectrum segment TOP (step 164). Inducing a tilt can include modifying parameters of the spectrum controller 54 to induce a loss in the optical signal. If the input power is not within an acceptable range, such as being too low (step 160), the spectrum controller 54 can replace the input spectrum with the power management signal to ensure operation of traffic in the other assigned spectrum segments with minimal impact (step 162). The spectrum partitioning device 50 can also ensure the RX spectrum provided to the SLTE matches the spectral segment defined for the TX from the SLTE.

The spectrum partitioning device 50 and the spectrum partitioning method 150 can emulate a provisionable number of TOP controlled repeaters 20 in a single device while monitoring the input to ensure requirements are maintained to allow each input to operate without impacting the other inputs. The spectrum partitioning device 50 automates the control of sharing spectrum on the submarine optical network 10b that allows the interconnected signal generating terminals to operate as a number of arbitrarily sized TOP controlled optical Virtual Private Networks that are independent of each other. The spectrum partitioning device 50 uses flexible grid spacing optical spectrum control points to define and create the optical virtual private networks. Flexible grid monitoring is used to confirm the SLTE terminal signals stay within defined specifications. A control loop between the monitoring and control points is used to detected and replace signals from the terminals that do not comply with the specifications with a benign optical idler to ensure that inputs that do comply with specifications to operate.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method, implemented in a spectrum partitioning device, of sharing optical spectrum between a plurality of users of a submarine optical system, the method comprising:
receiving one or more optical signals from respective Submarine Line Terminating Equipment (SLTE) associated with each of the plurality of users of the submarine optical system, wherein each of the plurality of users are assigned a slice of optical spectrum on the submarine optical system, wherein each respective SLTE is separate from and operates independent from the spectrum partitioning device and is not under the control of an operator of the spectrum partitioning device; and
for each of the received optical signals,
continuously monitoring the optical signal to determine compliance with respective one or more constraints in the assigned slice,
selectively switching the optical signal to a common port connected to the submarine optical system in the assigned slice if compliant with the respective one or more constraints, and
selectively switching a power management signal in the assigned slice to the common port for addition to the submarine optical system if not compliant with the respective one or more constraints.

2. The method of claim 1, wherein the one or more constraints relate to spectrum width and total output power of each of the optical signals.

3. The method of claim 1, further comprising:
adding a power management signal in unallocated spectrum on the submarine optical system.

4. The method of claim 1, wherein each of the slices of the optical spectrum is defined with a total output power and a power spectral density mask that is monitored for compliance thereto.

5. The method of claim 1, wherein the one or more constraints comprise a total output power and/or a power spectral density mask for a specific slice of the optical spectrum.

6. The method of claim 1, further comprising:
if the one or more optical signals for a specific slice are above a defined threshold, inducing a tilt on the one or more optical signals to maintain total output power for the specific slice.

7. The method of claim 1, further comprising:
preventing access by each of the plurality of users to other portions of the optical spectrum besides their assigned slice.

8. The method of claim 1, wherein the one or more optical signals are added to a cable interfacing a wet plant of the submarine optical system, the wet plant comprising repeaters that operate in a total output power mode, and wherein the associated SLTE forming the one or more optical signals is demarcated and operated separately from the wet plant.

9. The method of claim 1, wherein the receiving step, the monitoring step, and the adding step are performed by a spectrum partitioning device independent from the associated SLTE.

10. A spectrum partitioning device for sharing optical spectrum between a plurality of users of a submarine optical system, the spectrum partitioning device comprising:
N input ports each configured to receive one or more optical signals from respective Submarine Line Terminating Equipment (SLTE) associated with each of the plurality of users of the submarine optical system, wherein each of the plurality of users are assigned a slice of optical spectrum on the submarine optical system, wherein each respective SLTE is separate from and operates independent from the spectrum partitioning device and is not under the control of an operator of the spectrum partitioning device;
a common port coupled to a wet plant of the submarine optical system; and
a wavelength switching component configured to selectively switch one of the N input ports to the common port,
wherein, for each of the received optical signals, the spectrum partitioning device is configured to
continuously monitor the optical signal to determine compliance with respective one or more constraints in the assigned slice,
add the optical signal to the submarine optical system in the assigned slice if compliant with the respective one or more constraints, and
add a power management signal in the assigned slice for addition to the submarine optical system if not compliant with the respective one or more constraints.

11. The spectrum partitioning device of claim 10, wherein the one or more constraints relate to spectrum width and total output power of each of the optical signals.

12. The spectrum partitioning device of claim 10, wherein the wavelength switching components are configured to add a power management signal in unallocated spectrum on the submarine optical system.

13. The spectrum partitioning device of claim 10, wherein each of the slices of the optical spectrum is defined with a total output power and a power spectral density mask that is monitored for compliance thereto.

14. The spectrum partitioning device of claim 10, wherein the one or more constraints comprise a total output power and/or a power spectral density mask for a specific slice of the optical spectrum.

15. The spectrum partitioning device of claim 10, wherein, if the one or more optical signals for a specific slice are above a defined threshold, the wavelength switching components are configured to induce a tilt on the one or more optical signals to maintain total output power for the specific slice.

16. The spectrum partitioning device of claim 10, wherein the wavelength switching components are configured to prevent access by each of the plurality of users to other portions of the optical spectrum besides the assigned slice.

17. The spectrum partitioning device of claim 10, wherein associated SLTE forming the one or more optical signals is demarcated and operated separately from the wet plant with repeaters in the wet plant operating in a total output power mode.

18. The spectrum partitioning device of claim 10, wherein the wavelength switching components are a Wavelength Selective Switch.

19. A submarine optical system, with users each responsible for theft own associated head end equipment, the submarine optical system comprising:
a wet plant; and
a spectrum partitioning device between the wet plant and respective Submarine Line Terminating Equipment (SLTE) associated with each of the users, wherein each of the users are assigned a slice of optical spectrum on the submarine optical system, wherein each respective SLTE is separate from and operates independent from the spectrum partitioning device and is not under the control of an operator of the spectrum partitioning device, wherein a wavelength switching component configured to selectively switch received optical signals from respective SLTE to a common port; and wherein, for each of the received optical signals, the spectrum partitioning device is configured to
continuously monitor the optical signal to determine compliance with respective one or more constraints in the assigned slice,
add the optical signal to the submarine optical system in the assigned slice if compliant with the respective one or more constraints, and
add a power management signal in the assigned slice for addition to the submarine optical system if not compliant with the respective one or more constraints.

20. The submarine optical system of claim 19, wherein at least two of the users of the SLTE comprise independent operators from one another.

\* \* \* \* \*